(12) United States Patent
Sasaki et al.

(10) Patent No.: US 7,700,204 B2
(45) Date of Patent: *Apr. 20, 2010

(54) MAGNETIC RECORDING MEDIUM CONTAINING PARTICLES WITH A CORE CONTAINING A $FE_{16}N_2$ PHASE

(75) Inventors: Yuji Sasaki, Otokuni-gun (JP); Mikio Kishimoto, Moriya (JP); Naoki Usuki, Otokuni-gun (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 191 days.

This patent is subject to a terminal disclaimer.

(21) Appl. No.: 11/754,911

(22) Filed: May 29, 2007

(65) Prior Publication Data

US 2007/0224457 A1    Sep. 27, 2007

Related U.S. Application Data

(62) Division of application No. 10/489,735, filed as application No. PCT/JP2004/001773 on Feb. 18, 2004, now Pat. No. 7,238,439.

(30) Foreign Application Priority Data

Feb. 19, 2003  (JP)  ............................. 2003-040467

(51) Int. Cl.
    G11B 5/706  (2006.01)
    G11B 5/712  (2006.01)
(52) U.S. Cl. .................................. 428/842.6; 428/842.9
(58) Field of Classification Search ........................ None
    See application file for complete search history.

(56) References Cited

U.S. PATENT DOCUMENTS 3,904,448 A    9/1975  Takahashi et al.
4,020,236 A    4/1977  Aonuma et al.
4,324,177 A    4/1982  Tsuji et al.

(Continued)

FOREIGN PATENT DOCUMENTS

DE    69326124 T2    6/1994

(Continued)

OTHER PUBLICATIONS

Derwent Abstract Translation of WO 2003-079333 A1 (Derwent Acc No. 2003-748695).*

(Continued)

*Primary Examiner*—Kevin M Bernatz
(74) *Attorney, Agent, or Firm*—Birch, Stewart, Kolasch & Birch, LLP.

(57) ABSTRACT

A magnetic recording medium comprising a nonmagnetic support and a magnetic layer formed on the support and containing a magnetic powder and a binder, wherein said magnetic powder comprises substantially spherical or ellipsoidal particles and at least one element selected from the group consisting of rare earth elements, silicon and aluminum, and has a $Fe_{16}N_2$ phase, an average particle size of 5 to 30 nm and an axis ratio (a ratio of a major axis to a minor axis) of 1 to 2. This magnetic recording medium achieves a high output and has excellent short wavelength recording properties, since it uses a magnetic powder having a very small particle size and has a very high coercive force and a saturation magnetization suitable for high density recording.

8 Claims, 2 Drawing Sheets

U.S. PATENT DOCUMENTS

| | | | |
|---|---|---|---|
| 4,451,535 | A | 5/1984 | Pingaud et al. |
| 4,643,942 | A | 2/1987 | Ohtsubo |
| 4,952,444 | A | 8/1990 | Kawamata et al. |
| 5,156,922 | A | 10/1992 | Mishima et al. |
| 5,252,380 | A | 10/1993 | Nakazumi et al. |
| 5,380,905 | A | 1/1995 | Haidos et al. |
| 5,494,722 | A | 2/1996 | Oka et al. |
| 5,496,607 | A | 3/1996 | Inaba et al. |
| 5,518,804 | A | 5/1996 | Mizuno et al. |
| 5,637,390 | A | 6/1997 | Isobe et al. |
| 5,645,917 | A | 7/1997 | Ejiri et al. |
| 5,935,674 | A | 8/1999 | Saito et al. |
| 6,071,608 | A | 6/2000 | Yoshida et al. |
| 6,136,428 | A * | 10/2000 | Truong et al. ............... 428/323 |
| 6,307,700 | B1 | 10/2001 | Takayama et al. |
| 6,319,485 | B1 | 11/2001 | Nagatomi et al. |
| 6,372,338 | B1 | 4/2002 | Jeffers et al. |
| 6,517,934 | B1 | 2/2003 | Kishimoto |
| 6,534,168 | B2 | 3/2003 | Naoe et al. |
| 6,607,807 | B2 | 8/2003 | Zinbo et al. |
| 6,780,531 | B2 | 8/2004 | Tani et al. |
| 6,964,811 | B2 | 11/2005 | Kishimoto et al. |
| 2003/0194582 | A1 | 10/2003 | Ishikawa et al. |
| 2004/0089564 | A1 | 5/2004 | Kuse et al. |
| 2004/0247859 | A1 | 12/2004 | Sasaki et al. |
| 2005/0276999 | A1 | 12/2005 | Kuse et al. |
| 2006/0008645 | A1 | 1/2006 | Kishimoto et al. |

FOREIGN PATENT DOCUMENTS

| | | |
|---|---|---|
| EP | 0 602 533 | 6/1994 |
| EP | 1 071 102 A1 | 1/2001 |
| JP | 52-5720 A | 2/1977 |
| JP | 55-86103 A | 6/1980 |
| JP | 64-001297 B | 10/1980 |
| JP | 57-183629 A | 11/1982 |
| JP | 60-130103 A | 7/1985 |
| JP | 60-157719 A | 8/1985 |
| JP | 60-204862 | 10/1985 |
| JP | 07-060504 B | 9/1987 |
| JP | 63-187418 A | 8/1988 |
| JP | 63-191315 A | 8/1988 |
| JP | 03-049026 A | 3/1991 |
| JP | 03-97203 A | 4/1991 |
| JP | 03-101102 A | 4/1991 |
| JP | 4-19815 A | 1/1992 |
| JP | 04-248120 A | 9/1992 |
| JP | 04-318321 A | 9/1992 |
| JP | 05-073883 A | 3/1993 |
| JP | 05-090018 B | 4/1993 |
| JP | 05-217148 | 8/1993 |
| JP | 5-234064 A | 9/1993 |
| JP | 05-274644 A | 10/1993 |
| JP | 05-298653 | 11/1993 |
| JP | 6-25702 A | 2/1994 |
| JP | 06-36265 A | 2/1994 |
| JP | 6-139553 A | 5/1994 |
| JP | 10-083906 | 3/1998 |
| JP | 11-126327 A | 5/1999 |
| JP | 11-126328 A | 5/1999 |
| JP | 11-213384 A | 8/1999 |
| JP | 11-238225 A | 8/1999 |
| JP | 11-297034 A | 10/1999 |
| JP | 11-339254 A | 10/1999 |
| JP | 11-340023 A | 12/1999 |
| JP | 2000-30238 A | 1/2000 |
| JP | 2000-040217 A | 2/2000 |
| JP | 2000-040218 A | 2/2000 |
| JP | 2000-277311 A | 10/2000 |
| JP | 2000-293836 A | 10/2000 |
| JP | 2000-315312 A | 11/2000 |
| JP | 2001-043525 A | 2/2001 |
| JP | 2001-67649 A | 3/2001 |
| JP | 2001-81506 A | 3/2001 |
| JP | 2001-110164 A | 4/2001 |
| JP | 2001-148115 A | 5/2001 |
| JP | 2001-176715 A | 6/2001 |
| JP | 2001-181754 A | 7/2001 |
| JP | 2001-273620 A | 10/2001 |
| JP | 2001-273626 A | 10/2001 |
| JP | 2001-325720 A | 11/2001 |
| JP | 2001-338418 A | 12/2001 |
| JP | 2002-050029 A | 2/2002 |
| JP | 2002-56518 A | 2/2002 |
| JP | 2002-288817 A | 10/2002 |
| JP | 2003-073705 A | 3/2003 |
| WO | WO-00/48210 A1 | 8/2000 |
| WO | WO 03/079332 A1 * | 9/2003 |
| WO | WO 03/079333 A1 * | 9/2003 |

OTHER PUBLICATIONS

Derwent Abstract Translation of WO 2003-079332 A1 (Derwent Acc No. 2003-748694).*

Nagatomi et al., Powder and Powder Metallurgy, vol. 46, No. 2, pp. 151-155, (1999).

Hattori et al., Trans. of the Mag. Soc. of Japan, vol. 25, pp. 927-930, (2001).

English language machine translation of JP 2000-277311.

Derwent Abstract Translation of WO 2003/079332 A1 and AU 2003/211248 A1 (Derwent Acc. No. 2003-748694).

English language machine translation of JP-10-083906 (having a publication date of Mar. 31, 1998).

* cited by examiner

MAGNETIC RECORDING MEDIUM CONTAINING PARTICLES WITH A CORE CONTAINING A $FE_{16}N_2$ PHASE

This application is a Divisional of application Ser. No. 10/489,735 filed on Mar. 16, 2004, which is now U.S. Pat. No. 7,238,439 B2 issued Jul. 3, 2007 and for which priority is claimed under 35 U.S.C. 120. Application Ser. No. 10/489,735 (U.S. Pat. No. 7,238,439) is the national phase of PCT International Application No. PCT/JP2004/001773 filed on Feb. 18, 2004 under 35 U.S.C. 371. The entire contents of each of the above-identified applications are hereby incorporated by reference.

FIELD OF THE INVENTION

The present invention relates to a magnetic recording medium comprising magnetic powder particles having substantially spherical or ellipsoidal shapes which comprise at least iron and nitrogen as constituent elements. In particular, the present invention relates to a magnetic recording medium suitable for high density recording such as a digital video tape, a backup tape for a computer, etc.

BACKGROUND ART

Coating type magnetic recording media, that is, magnetic recording media comprising a nonmagnetic support and a magnetic layer formed on the support and comprising magnetic powder and a binder, are required to have a further increased recording density with the shift of a writing-reading system from an analog system to a digital one. In particular, such requirement has been increased year by year in the video tapes and the backup tapes for computers which are used for high density recording.

To cope with short wavelength recording which is inevitable to increase a recording density, it is effective to decrease the thickness of a magnetic layer to 300 nm or less, in particular, to 100 nm or less so as to decrease a thickness loss during recording. In general, a magneto resistance head (MR head) is used as a reproducing head which is used in combination with such high density recording media.

The particle size of magnetic powder has been decreased year by year to reduce a noise. Nowadays, acicular metal magnetic powder having a particle size of about 100 nm is practically used. Furthermore, to prevent the decrease of output caused by demagnetization during short wavelength recording, the coercive force of the magnetic powder has been increased, and a coercive force of about 238.9 A/m (about 3,000 Oe) is realized with an iron-cobalt alloy (see JP-A-3-49026, JP-A-10-83906 and JP-A-10-34085).

However, a coercive force depends on the shape of acicular magnetic particles in a magnetic recording medium comprising acicular magnetic particles. Thus, it is difficult to further decrease the particle size of such acicular magnetic particles. That is, if the particle size is further decreased, a specific surface area greatly increases and saturation magnetization greatly decreases. Consequently, the high saturation magnetization, which is the most significant characteristic of metal or metal alloy magnetic powder, is deteriorated, so that the use of the metal or metal alloy becomes meaningless.

In view of the above circumstance, a magnetic recording medium using, as a magnetic powder which is totally different from the acicular magnetic powder, a rare earth element-transition metal particulate magnetic powder such as a spherical or ellipsoidal rare earth element-iron-boron magnetic powder is proposed (see JP-A-2001-181754). This medium can greatly decrease the particle size of the magnetic powder and achieve a high saturation magnetization and a high coercive force. Therefore, this medium significantly contributes to the increase of a recording density.

Also, a magnetic recording medium using, as an iron magnetic powder having a non-acicular particle shape, an iron nitride magnetic powder which comprises random shape particles and a $Fe_{16}N_2$ phase as a main phase, and has a BET specific surface area of about 10 $m^2/g$ is proposed (see JP-A-2000-277311).

However, the rare earth element-iron-boron magnetic powder of JP-A-2001-181754 is a composite material which comes into existence based on the balance of a high magnetic anisotropy due to the rare earth element compound and high saturation magnetization due to the iron material which forms the cores of the magnetic particles. If such a magnetic powder is further improved, for example, the coercive force of such a magnetic powder is intended to be further increased, it is very difficult to improve the magnetic properties while maintaining the optimum dispersibility and chemical stability of the magnetic recording medium. JP-A-2000-277311 discloses the iron nitride magnetic powder having a BET specific surface area of 10 to 22 $m^2/g$ in the Example. However, such magnetic powder has a very large particle size and is not suitable for high density magnetic recording with achieving the decrease of noise.

The main characteristic of the iron nitride magnetic powder of JP-A-2000-277311 is the high saturation magnetization, and the magnetic powder produced in the Examples had a saturation magnetization of 190 to 200 $Am^2/kg$ (190 to 200 emu/g). However, the magnetic powder having such a very large saturation magnetization may not be suitably used in a magnetic recording medium for high density recording, because when the saturation magnetization is too high, the recording medium has too large saturation magnetization so that the recording demagnetization becomes remarkable. This tendency becomes more remarkable as a recording wavelength is made shorter. Therefore, magnetic powder of JP-A-2000-277311 is not suitable for high density recording.

In particular, in the case of high density magnetic recording media, it is essential to adequately decrease the saturation magnetization of a magnetic powder and decrease the thickness of a magnetic layer in order to decrease the recording demagnetization. As a magnetic flux density decreases, a magnetic flux from the surface of a magnetic recording medium deceases and in turn a reproducing output decreases. With the recent astonishing progress of magnetic head technology such as MR heads, recorded signals can be reproduced with a high sensitivity even with the small magnetic flux. Therefore, to achieve the high density recording, it is now necessary to increase a coercive force while setting the saturation magnetization of magnetic powder at a suitable value lower than a value which has been required.

SUMMARY OF THE INVENTION

In view of the above-described circumstances, one object of the present invention is providing a magnetic recording medium, which achieves a higher output and has excellent short wavelength recording properties by the use of a magnetic powder having a very small particle size, an extremely high coercive force and also a saturation magnetization suitable for high density recording.

To achieve the above object, the present inventors have made extensive researches. As a result, it has been found that an iron nitride magnetic powder, which comprises at least a $Fe_{16}N_2$ phase and has an substantially spherical or ellipsoidal particle shape and a very small particle size such as an average particle size of 5 to 30 nm, has an extremely high coercive force and a saturation magnetization suitable for high density recording, and that, when such a magnetic powder is used, a very thin magnetic layer suffering from no or little decrease of output due to recording demagnetization can be realized, a high output is achieved, and excellent short wavelength recording properties are achieved.

In the present invention, an axis ratio (a ratio of a major axis to a minor axis) of the substantially spherical or ellipsoidal particles is preferably 2 or less, more preferably from 1 to 1.5, as shown in FIG. 2. When the axis ratio exceeds 2, a part of the magnetic powder particles may stand in a direction across the surface of a magnetic layer in the course of coating a magnetic paint, so that the surface smoothness of the magnetic layer deteriorates and thus electromagnetic conversion properties are worsened.

The present invention does not exclude magnetic powder particles having some irregularity on their surfaces, as shown in FIG. 2.

It has also been found that, when the iron nitride magnetic powder contains at least one element selected from the group consisting of rare earth elements, silicon and aluminum, the maintenance of the shape of the magnetic particles in a heat-treatment step and the dispersibility of the particles in a magnetic paint are improved, the magnetic layer is further made thin, and also the excellent short wavelength recording properties, which are hardly achieved by the prior art, can be attained.

The present invention has been completed based on the above findings.

That is, the present invention relates to a magnetic recording medium comprising a nonmagnetic support and a magnetic layer formed on the support and containing a magnetic powder and a binder, wherein said magnetic powder comprises substantially spherical or ellipsoidal particles and at least one element selected from the group consisting of rare earth elements, silicon and aluminum, and has a $Fe_{16}N_2$ phase, an average particle size of 5 to 30 nm and an axis ratio (a ratio of a major axis to a minor axis) of 1 to 2.

In one preferred embodiment, the magnetic recording medium of the present invention has a coercive force of 79.6 to 318.4 kA/m (1,000 to 4,000 Oe), a squareness ratio (Br/Bm) of 0.6 to 0.9 both in the longitudinal direction, and a product (Bm·t) of a saturated magnetic flux density (Bm) and a thickness (t) of a magnetic layer of 0.001 to 0.1 μTm. In another preferred embodiment, the magnetic recording medium of the present invention has at least one primer layer comprising a nonmagnetic powder and a binder between the nonmagnetic layer and the magnetic layer, and a thickness of the magnetic layer of 300 nm or less, in particular, 10 to 300 nm.

DETAILED DESCRIPTION OF THE INVENTION

Figure 1:
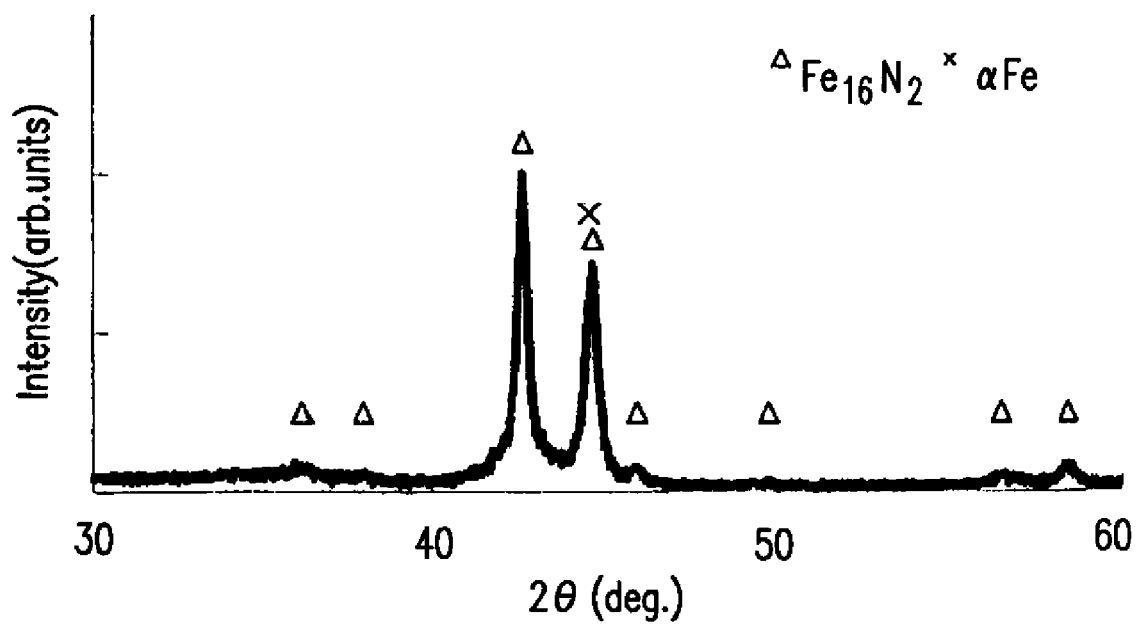
FIG. 1 is an X-ray diffraction pattern of the yttrium-iron nitride magnetic powder used in Example 1.

From the different viewpoint than conventional magnetic powder which is based on shape magnetic anisotropy, the present inventors have synthesized various magnetic powders and studied their shapes and magnetic anisotropies to obtain a magnetic powder having improved magnetic properties. As a result, it has been found that a magnetic powder comprising at least iron and nitrogen as constituent elements and having at least a $Fe_{16}N_2$ phase has high magnetic anisotropy.

In the magnetic powder according to the present invention, the content of nitrogen is, based on the iron amount, from 1.0 to 20.0 atomic %, preferably from 5.0 to 18.0 atomic %, more preferably from 8.0 to 15.0 atomic %. When the content of nitrogen is too small, the smaller amount of the $Fe_{16}N_2$ phase is formed so that the coercive force is not effectively increased. When the content of nitrogen is too large, nonmagnetic nitrides tend to be formed so that the coercive force is not effectively increased, and the saturation magnetization is excessively decreased.

The particles of iron nitride magnetic powder of the present invention have substantially spherical or ellipsoidal shapes, which is different from the shape of conventional acicular magnetic particles, and their average particle size is preferably from 5 to 50 nm, in particular, from 5 to 30 nm to satisfy the requirement for fine particles. When the particle size is too small, the dispersibility of the magnetic powder in a magnetic paint during preparation is worsened, and the magnetic powder becomes thermally unstable so that the coercive force tends to change over time. When the particle size is too large, the noise increases and also the magnetic layer may not have a smooth surface.

Herein, the average particle size is obtained by actually measuring particle sizes of 300 particles in a photograph taken with a transmission electron microscope (TEM) and averaging the measured particle sizes.

The iron nitride magnetic powder of the present invention has a moderate saturation magnetization of 80 to 160 $Am^2/kg$ (80 to 160 emu/g), which is not excessively high, unlike the conventional magnetic powder disclosed in JP-A-2001-181754 and JP-A-2000-277311. The coercive force of the iron nitride magnetic powder of the present invention reaches 318.4 kA/m (4,000 Oe), which is about 25% higher than that of the conventional magnetic powders. When a magnetic recording medium is produced using such a magnetic powder, it has a coercive force of 79.6 to 318.4 kA/m (1,000 to 4,000 Oe) and a squareness ratio of 0.6 to 0.9 both in the longitudinal direction, and a product of a saturated magnetic flux density and a thickness of a magnetic layer of 0.001 to 0.1 μTm.

Furthermore, when the iron nitride magnetic powder contains a rare earth element, the surfaces of the magnetic particles are improved, and the addition of the rare earth element is effective to improve not only the maintenance of the shape of the magnetic particles in a heat-treatment step but also the dispersibility of the particles in a magnetic paint.

The content of the rare earth element is usually from 0.05 to 20 atomic %, preferably from 0.1 to 15.0 atomic %, more preferably from 0.5 to 10.0 atomic %, based on the amount of iron element. When the content of the rare earth element is too low, the dispersibility of the magnetic particles may not be sufficiently improved, and the effect to maintain the shape of the magnetic particles in a reducing step decreases. When the content of the rare earth element is too large, the ratio of the unreacted rare earth element to the rare earth element added increases, and the unreacted rare earth element interferes with the dispersing and coating steps. Furthermore, the coercive force and saturation magnetization may excessively decrease.

Apart from the rare earth element, the addition of silicon and/or aluminum can improve the dispersibility of the magnetic particles. Since silicon and aluminum are less expensive than the rare earth element, they are advantageous from the viewpoint of costs. When a rare earth element, silicon or aluminum is used in combination, the surface conditions of the magnetic particles can be designed in more detail.

The substantially spherical or ellipsoidal iron nitride magnetic powder, which contains iron and nitrogen as the essential elements with the content of nitrogen being limited in the above specific range, and has at least a $Fe_{16}N_2$ phase and a specific particle size, consists of the finer particles than the conventional magnetic powders, and has an adequate saturation magnetization. Furthermore, the addition of the rare earth element, or silicon or aluminum can further improve the dispersibility of the magnetic particles, so that the magnetic layer can be made thinner.

The iron nitride magnetic powder of the present invention also has improved storage stability. When the magnetic powder or the magnetic recording medium comprising such a magnetic powder is stored at a high temperature and a high humidity, the magnetic characteristics such as saturated magnetic flux density are less degraded. Thus, the magnetic powder of the present invention exhibits the properties feasible for the high density recording magnetic recording media such as digital video tapes and backup tapes for computers coupled with the above properties.

Any reason for such effects has not been clarified, but some reason may be as follows:

The magnetic powder of the present invention may have the peculiar properties, which are not found in the conventional magnetic powders, through the synergistic effect of the high magnetic anisotropy of the $Fe_{16}N_2$ phase and the surface magnetic anisotropy of the fine particles. Furthermore, when the compound comprising the rare earth element, silicon or aluminum is present on the surfaces of the magnetic particles, the dispersibility of the magnetic powder is improved, and such elements contribute to the maintenance of the shape of the magnetic particles in the reducing step so that the particle size distribution is made narrow.

Although the $Fe_{16}N_2$ phase may be present inside the particles of the iron nitride magnetic powder of the present invention, the larger portion of the $Fe_{16}N_2$ phase is present preferably in the outer layers of the magnetic particles to increase the surface magnetic anisotropy. Thereby, the intended effects are more easily achieved.

To achieve the high dispersibility and good maintenance of the shape of the magnetic particles, the rare earth element or silicon or aluminum is also present in the form of the compound of such an element in the outer layers of the magnetic particles, which comprise an inner layer and an outer layer, although it may be present inside the magnetic particles.

In the present invention, the inner layer of the magnetic particles preferably consists of the $Fe_{16}N_2$ phase, while it may comprise a mixed phase of the $Fe_{16}N_2$ phase and an α-Fe phase. Such a mixed phase can provide flexibility to the design of the magnetic recording media, since the desired coercive force can easily be attained by the adjustment of the ratio of the $Fe_{16}N_2$ phase to the α-Fe phase.

Examples of the rare earth element include yttrium, ytterbium, cesium, praseodymium, lanthanum, europium, neodymium, etc. Among them, yttrium, samarium or neodymium is preferably used, since these elements have a large effect to maintain the shape of the magnetic particles in the reducing step.

Apart from silicon and aluminum, the magnetic powder of the present invention may optionally comprise boron, phosphorus, carbon, calcium, magnesium, zirconium, barium, strontium, etc. as an effective element. When such an element is used together with the rare earth element, the magnetic powder has the high shape maintenance and good dispersibility.

Now, the production method of the iron nitride magnetic powder is explained.

As a raw material, an oxide or hydroxide of iron is used. Examples of such oxide or hydroxide include hematite, magnetite, goethite, etc. The average particle size of the raw material is not limited, and is usually from 5 to 80 nm, preferably from 5 to 50 nm, more preferably from 5 to 30 nm. When the particle size of the raw material is too small, the particles tend to be sintered together in the reducing treatment. When it is too large, the particles may be less uniformly reduced so that the control of the particle size and/or magnetic properties of the magnetic powder is difficult.

The rare earth element may be adhered to the surface of the raw material particles. Usually, the raw material is dispersed in an aqueous solution of an alkali or an acid. Then, the salt of the rare earth element is dissolved in the solution and the hydroxide or hydrate of the rare earth element is precipitated and deposited on the raw material particles by a neutralization reaction, etc.

Alternatively, a compound of silicon or aluminum may be dissolved in a solvent and the raw material is dipped in the solution so that such an element can be deposited on the raw material particles. To effectively carry out the deposition of such an element, an additive such as a reducing agent, a pH-buffer, a particle size-controlling agent, etc. may be mixed in the solution. Silicon or aluminum may be deposited at the same time as, or alternately with the deposition of the rare earth element.

Then, the raw material particles are reduced by heating them in the atmosphere of a reducing gas. The kind of the reducing gas is not limited. Usually a hydrogen gas is used, but other reducing gas such as carbon monoxide may be used.

A reducing temperature is preferably from 300 to 600° C. When the reducing temperature is lower than 300° C., the reducing reaction may not sufficiently proceed. When the reducing temperature exceeds 600° C., the particles tend to be sintered.

After the thermal reduction of the particles, they are subjected to a nitriding treatment. Thereby, the magnetic powder comprising iron and nitrogen as the essential element according to the present invention is obtained. The nitriding treatment is preferably carried out with a gas containing ammonia. Apart from pure ammonia gas, a mixture of ammonia and a carrier gas (e.g. hydrogen gas, helium gas, nitrogen gas, argon gas, etc.) may be used. The nitrogen gas is preferable since it is inexpensive.

The nitriding temperature is preferably from 100 to 300° C. When the nitriding temperature is too low, the particles are not sufficiently nitrided so that the coercive force may insufficiently be increased. When the nitriding temperature is too high, the particles are excessively nitrided so that the proportion of $Fe_4N$ and $Fe_3N$ phases increases and thus the coercive force may rather be decreased and also the saturation magnetization tends to excessively decrease.

The nitriding conditions are selected so that the content of the nitrogen atoms is usually from 1.0 to 20.0 atomic % based on the amount of iron in the magnetic powder obtained. When the content of the nitrogen atoms is too small, the coercive force is not effectively increased since the generated amount of the $Fe_{16}N_2$ phase is small. When the content of the nitrogen atoms is too large, $Fe_4N$ and $Fe_3N$ phases tend to form and thus the coercive force may rather be decreased and also the saturation magnetization tends to excessively decrease.

Different from the conventional acicular magnetic powders the magnetism of which is based on the shape magnetic anisotropy, the iron nitride magnetic powder of the present invention has the large crystalline magnetic anisotropy. Thus, when the particles of the magnetic powder have the substantially spherical shape, they may exhibit the large coercive force in one direction.

When the magnetic powder of the present invention comprises fine particles having an average particle size of 5 to 30 nm, it has a high coercive force and an adequate saturation magnetization, which enable the recording and erasing with a magnetic head. Therefore, it can provide excellent electromagnetic conversion properties to a coating type magnetic recording medium having a thin magnetic layer. Accordingly, the magnetic powder of the present invention has the saturation magnetization, coercive force, particle size and particle shape, all of which essentially serve for the formation of a thin magnetic layer.

The present invention achieves the good recording-reproducing characteristics by the formation of a thin magnetic layer having, for example, 300 nm or less using the specific magnetic powder described above. The present invention involves a breakthrough in technology wherein a magnetic material has been found which has a high crystalline magnetic anisotropy, that is, a high coercive force and an adequate saturation magnetization, and also good dispersibility, while which has a very small particle size and the spherical or ellipsoidal shape. Such a magnetic material breaks the bounds of common knowledge in the field of the coating type magnetic recording media.

The magnetic recording medium of the present invention can be produced by applying a magnetic paint, which is prepared by mixing the iron nitride magnetic powder and a binder in a solvent, on the surface of a nonmagnetic support and drying the applied paint to form a magnetic layer. Prior to the formation of the magnetic layer, a primer layer may be formed on the surface of the nonmagnetic support by applying a primer coating containing nonmagnetic powder (e.g. iron oxide, titanium oxide, aluminum oxide, etc.) and a binder and drying it, and then the magnetic layer is formed on the primer layer.

Hereinafter, the elements of the magnetic recording medium of the present invention, that is, (a) nonmagnetic supports, (b) a magnetic layer, and (c) a primer layer will be explained. Furthermore, (d) binders and (e) lubricants, which are contained in the magnetic layer and/or the primer layer, will be explained.

When the magnetic recording medium is a magnetic tape, (f) a backcoat layer is preferably formed on the back face of the nonmagnetic support opposite to the surface having the magnetic layer thereon by applying a backcoat paint to the back face and drying it. Thus, the backcoat layer (f) will also be explained.

In addition, (g) solvents contained in the magnetic paint, primer paint and backcoat paint, (h) methods for dispersing and applying such paints, and (i) the LRT treatment of the magnetic layer, which are employed in the production of the magnetic recording medium, will be explained.

(a) Nonmagnetic Supports

The nonmagnetic support may be any one of those conventionally used in the magnetic recording media. Specific examples of the support are plastic films having a thickness of 2 to 15 μm, preferably 2 to 7 μm, made of polyesters (e.g. polyethylene terephthalate, polyethylene naphthalate, etc.), polyolefin, cellulose triacetate, polycarbonate, polyamide, polyimide, polyamideimide, polysulfone, aramide, aromatic polyamide, etc.), and the like. When the thickness of the nonmagnetic support is less than 2 μm, it is difficult to prepare such a thin film, or the tape strength decreases. When the thickness exceeds 7 μm, the total thickness of the magnetic tape increases so that the memory capacity per one reel decreases.

In the case of a magnetic tape, a nonmagnetic support having the anisotropy of Young's moduli is used. The Young's modulus of the nonmagnetic support in its machine direction varies with the thickness of the support and is preferably at least 4.9 GPa (500 kg/mm$^2$). When the thickness of the nonmagnetic support is 5 μm or less, the Young's modulus is preferably at least 9.8 GPa (1,000 kg/mm$^2$). When the Young's modulus is too small, the strength of the magnetic tape is insufficient, or the tape running becomes unstable.

A ratio of a Young's modulus in the machine direction (MD) to that (TD) in the transverse direction of the substrate (MD/TD) is preferably from 0.60 to 0.80 in a helical scan type. When this ratio (MD/TD) is within this range, the flatness of the outputs from an entrance to an exit of a track of a magnetic head increases, although no mechanism thereof has been clarified. In the case of a linear track system, the MD/TD ratio is preferably from 1.0 to 1.8, more preferably from 1.1 to 1.7. When the MD/TD ratio is within this range, the head touch is improved. Examples of such a nonmagnetic support include a polyethylene terephthalate film, a polyethylene naphthalate film, an aromatic polyamide film, and an aromatic polyimide film, etc.

(b) Magnetic Layer

The thickness of the magnetic layer is 300 nm or less to solve the problem of output decrease caused by demagnetization, which is an essential problem in the longitudinal recording. The thickness of the magnetic layer is determined in connection with there cording wave length used. The effects of the present invention are remarkable, when the present invention is employed with a system having the shortest recording wavelength of 1.0 μm or less.

The thickness of the magnetic layer is 300 nm or less, preferably from 10 to 300 nm, more preferably from 10 to 250 nm, most preferably from 10 to 200 nm. When the thickness of the magnetic layer exceeds 300 nm, the reproducing output decreases due to the thickness loss, and the product of the residual magnetic flux density and the thickness of the magnetic layer is too large so that the reproduction output may be skewed by the saturation of the MR head. When the thickness of the magnetic layer is less than 10 nm, a uniform magnetic layer may not be formed.

Since the magnetic powder of the present invention has a very small average particle size of 5 to 30 nm, and the substantially spherical or ellipsoidal shape, it enables the formation of a very thin magnetic layer, which cannot be formed with the conventional acicular magnetic powder.

In the case of a magnetic tape, the coercive force of the magnetic layer in the longitudinal direction is usually from 79.6 to 318.4 kA/m (1,000 to 4,000 Oe), preferably from 119.4 to 318.4 kA/m (1,500 to 4,000 Oe). When the coercive force is less than 79.6 kA/m, the output tends to be lowered due to the demagnetizing field demagnetization, as the recording wavelength is shortened. When the coercive force exceeds 318.4 kA/m, it is difficult to record signals with a magnetic head.

The squareness ratio (Br/Bm) in the longitudinal direction of the magnetic tape is usually from 0.6 to 0.9, in particular, from 0.8 to 0.9.

Furthermore, the product of the saturated magnetic flux density and the thickness is usually from 0.001 to 0.1 μTm, preferably from 0.0015 to 0.05 μTm. When the product is less than 0.001 μTm, the reproducing output is low even if a MR head is used. When the product exceeds 0.1 μTm, the high output may not be attained in the intended short wavelength range.

In the case using a MR head, the contact of the magnetic recording medium to the MR head is improved, and the reproducing output increases, when the average surface roughness Ra of the magnetic layer is from 1.0 to 3.2 nm, and $(P_1-P_0)$ is from 10 to 30 nm and $(P_1-P_{20})$ is 5 nm or less, wherein $P_0$ is the center value of the unevenness of the magnetic layer; $P_1$ is the height of the highest projection of the magnetic layer; and $P_{20}$ is the height of the 20th highest projection. The evaluation conditions are described in JP-A-2002-203308 (or US-2002-0164503-A).

The magnetic layer may contain conventional carbon black to improve the conductivity and the surface lubricity. As carbon black, acetylene black, furnace black, thermal black, etc. may be used. Carbon black having a particle size of 5 to 200 nm is preferably used, and carbon black having a particle size of 10 to 100 nm is more preferable. When the particle size of carbon black is less than 5 nm, the dispersion of carbon black particles is difficult. When the particle size of carbon black exceeds 200 nm, a large amount of carbon black should be added. In either case, the surface of the magnetic layer is roughened and thus the output tends to decrease.

The amount of carbon black is preferably from 0.2 to 5% by weight, more preferably from 0.5 to 4% by weight, based on the weight of the ferromagnetic powder. When the amount of carbon black is less than 0.2% by weight, the effect of the addition of carbon black is insufficient. When the amount of carbon black exceeds 5% by weight, the surface of the magnetic layer tends to be roughened.

(c) Primer Layer

A primer layer is not an essential element, but may be formed between the nonmagnetic support and the magnetic layer to improve the durability of the magnetic recording medium. The thickness of the primer layer is preferably from 0.1 to 3.0 μm, more preferably from 0.15 to 2.5 μm.

When the thickness of the primer layer is less than 0.1 μm, the durability of the magnetic tape may deteriorate. When the thickness of the primer layer exceeds 3.0 μm, the effect to improve the durability of the magnetic tape is saturated, and the total thickness of the magnetic tape increases. Accordingly, the length of the tape per one reel decreases and, in turn, the recording capacity decreases.

The primer layer may contain nonmagnetic powder such as titanium oxide, iron oxide or aluminum oxide to control the viscosity of the primer paint or the stiffness of the medium.

Preferably, the nonmagnetic iron oxide is used as such or in combination with aluminum oxide.

The content of the nonmagnetic iron oxide is preferably from 35 to 83% by weight, more preferably from 40 to 80% by weight. When the content of the nonmagnetic iron oxide is less than 35% by weight, the effect to improve the strength of the coated film is insufficient. When this content exceeds 83% by weight, the strength of the coated film may decrease instead. The content of aluminum oxide is usually from 0 to 20% by weight, preferably from 2 to 10% by weight.

The nonmagnetic iron oxide particles may be of a needle shape, or particulate or random shape. The needle shape iron oxide preferably has an average major axis length of 50 to 200 nm and an average minor axis length (average particle size) of 5 to 50 nm. The particulate or random shape nonmagnetic iron oxide has an average particle size is preferably from 5 to 200 nm, more preferably from 5 to 150 nm, most preferably from 5 to 100 nm. When the particle size is smaller than the above lower limit, the iron oxide powder may not be uniformly dispersed in a solvent. When the particle size is larger than the above upper limit, the irregularity at the interface between the primer layer and the magnetic layer tends to increase.

Aluminum oxide preferably has an average particle size of 10 to 100 nm, more preferably from 20 to 100 nm, most preferably from 30 to 100 nm. When the average particle size is less than the above lower limit, aluminum oxide powder may not be uniformly dispersed in a solvent. When the particle size is larger than the above upper limit, the irregularity at the interface between the primer layer and the magnetic layer tends to increase.

The primer layer may contain carbon black such as acetylene black, furnace black, thermal black, etc. to improve the conductivity.

The carbon black preferably has an average particle size of 5 to 200 nm, more preferably 10 to 100 nm. Since the carbon black has a texture, the dispersion of the carbon black is difficult when the average particle size is too small, while the surface smoothness of the primer layer decreases when the average particle size is too large.

The content of carbon black depends on the particle size of the carbon black, and is preferably from 15 to 35% by weight. When the content of carbon black is less than 15% by weight, the effect to improve the conductivity is insufficient. When the content of the carbon black exceeds 35% by weight, such effect is saturated.

Preferably, the primer layer contains 15 to 35% by weight of carbon black having a particle size of 15 to 80 nm, more preferably 20 to 30% by weight of carbon black having a particle size of 20 to 50 nm. When carbon black having such a particle size is used in such an amount, the electrical resistance decreases and the running irregularity is suppressed.

The present invention does not avoid the addition of large size carbon black having an average particle size beyond the above range, as long as the surface smoothness is not impaired. In this case, preferably, the sum of the small size carbon black and the large size carbon black is within the above range.

The surface roughness of the magnetic layer, which is formed on the primer layer by a wet-on-wet method, can be reduced, when the primer layer contains 15 to 35% by weight of carbon black having an average particle size of 10 to 100 nm, 35 to 83% by weight of nonmagnetic iron oxide having an average major axis length of 50 to 200 nm and an average minor axis length of 5 to 50 nm, and optionally 0 to 20% by weight of aluminum oxide having an average particle size of 10 to 100 nm, based on the weight of the total nonmagnetic particles contained in the primer layer.

(d) Binders

A binder to be contained in the primer layer or the magnetic layer may be a combination of a polyurethane resin and at least one resin selected from the group consisting of vinyl chloride base reins such as a vinyl chloride resin, a vinyl chloride-vinyl acetate copolymer resin, a vinyl chloride-vinyl alcohol copolymer resin, a vinyl chloride-vinyl acetate-vinyl alcohol copolymer resin, a vinyl chloride-vinyl acetate-maleic anhydride copolymer resin and a vinyl chloride-hydroxyl group-containing alkyl acrylate copolymer resin; nitrocellulose; an epoxy resin; and the like.

Among them, a mixture of a vinyl chloride base resin and a polyurethane resin is preferable. In particular, a mixture of a vinyl chloride-hydroxyl group-containing alkyl acrylate copolymer resin and a polyurethane resin is preferably used.

Examples of the polyurethane resin include polyesterpolyurethane, polyetherpolyurethane, polyetherpolyesterpolyurethane, polycarbonatepolyurethane, polyesterpolycarbonate-polyurethane, etc.

Preferably, a binder resin having a functional group is used to increase the dispersibility and filling rate of the magnetic powder, etc. Examples of the functional group are —COOM, —SO$_3$M, —OSO$_2$M, —P=O(OM)$_3$, —O—P=O(OM)$_2$ [wherein M is a hydrogen atom, an alkali metal or an amine salt], —OH, —NR$_1$R$_2$, —NR$_3$R$_4$R$_5$ [wherein R$_1$, R$_2$, R$_3$, R$_4$ and R$_5$ are each a hydrogen atom or a hydrocarbon group having 1 to 10 carbon atoms], or an epoxy group. When two or more resins are used in combination, it is preferable that the polarities of the functional groups of the resins are the same. In particular, the combination of resins both having —SO$_3$M groups is preferable.

The binder is used in an amount of 7 to 50 parts by weight, preferably from 10 to 35 parts by weight, based on 100 parts by weight of the solid powders such as the magnetic powder and nonmagnetic powder. In particular, the combination of 5 to 30 parts by weight of a vinyl chloride base resin and 2 to 20 parts by weight of the polyurethane resin is preferably used as binders.

It is preferable to use a thermally curable crosslinking agent, which bonds with the functional groups in the binder to crosslink the binder. As the crosslinking agent, the following are preferably used: tolylene diisocyanate, hexamethylene diisocyanate and isophorone diisocyanate; reaction products of these isocyanates with compounds having plural hydroxyl groups such as trimethylolpropane; condensation products of these isocyanates, and the like. The crosslinking agent is used in an amount of 10 to 50 parts by weight, preferably 10 to 35 parts by weight, based on 100 parts by weight of the binder.

When the amount of the crosslinking agent to be contained in the magnetic layer is from 30 to 60% by weight of the total weight of the crosslinking agents contained in the primer layer and the magnetic layer, in particular, about a half of the weight of the crosslinking agent contained in the primer layer, the coefficient of dynamic friction of the magnetic layer against the slider of the MR head is preferably decreased. When the amount of the crosslinking agent is less than 30% by weight, the film strength of the magnetic layer tends to decrease, while, when it exceeds 60% by weight, the severer conditions for the wiping treatment using tissue (the LRT treatment conditions described below) should be used so as to decrease the coefficient of dynamic friction against the slider, which leads to the increase of costs.

(e) Lubricants

As a lubricant to be contained in the primer layer or the magnetic layer, any one of conventionally used fatty acids, fatty acid esters and fatty acid amides may be used. Among them, the combination of a fatty acid having at least 10 carbon atoms, preferably 12 to 30 carbon atoms and a fatty acid ester having a melting point of 35° C. or less, preferably 10° C. or less is particularly preferable.

The fatty acid having at least 10 carbon atoms may be linear or branched one, or a cis- or trans-isomer. The linear fatty acid is preferable because of good lubrication properties. Examples of such fatty acids include lauric acid, myristic acid, stearic acid, palmitic acid, behenic acid, oleic acid, linoleic acid, etc. Among them, myristic acid, stearic acid, palmitic acid, etc. are preferable.

Examples of the fatty acid esters having a melting point of 35° C. or less include n-butyl oleate, hexyl oleate, n-octyl oleate, 2-ethylhexyl oleate, oleyl oleate, n-butyl laurate, heptyl laurate n-butyl myristate, n-butoxyethyl oleate, trimethylolpropane trioleate, n-butyl stearate, sec-butyl stearate, isoamyl stearate, butylcellosolve stearate, etc. These fatty acid esters may be used in combination since the strength of coated films and an exuded amount thereof can be controlled depending on the difference of the molecular weights and chemical structures, and the difference of the melting points. Since those esters have the above melting points, they can easily migrate to the surface of the magnetic layer and thus they effectively exhibit the lubrication function, when the magnetic layer and the magnetic head are in contact with each other at a high speed, even if they are exposed to a low temperature and a low humidity.

In the case of a magnetic tape having a primer layer, the coating layer comprising the primer layer and the magnetic layer preferably contain lubricants having different functions.

The coefficient of dynamic friction of the magnetic tape against the guide of a tape-running system or the like can be decreased, when the primer layer contains 0.5 to 4% by weight of a higher fatty acid and 0.2 to 3% by weight of a higher fatty acid ester, based on the weight of the entire powder components in the primer layer. When the amount of the higher fatty acid is less than 0.5% by weight, the effect to decrease the coefficient of dynamic friction is insufficient. When the amount of the higher fatty acid exceeds 4% by weight, the primer layer may be plasticized and thus the toughness of the primer layer may be lost. When the amount of the higher fatty acid ester is less than 0.5% by weight, the effect to decrease the coefficient of friction is insufficient. When the amount of the higher fatty acid ester exceeds 3% by weight, the amount of the higher fatty acid ester which migrates to the magnetic layer may become too large, so that the magnetic tape may stick to the guide or the like of the feeding system.

The coefficient of dynamic friction of the magnetic tape against the guide roller of the feeding system or the slider of the MR head can be decreased, when the magnetic layer contains 0.2 to 3% by weight of a fatty acid amide (e.g. an amide of a higher fatty acid such as palmitic acid, stearic acid, etc.), and 0.2 to 3% by weight of a higher fatty acid ester, based on the weight of the magnetic powder. When the amount of the fatty acid amide is less than 0.2% by weight, the coefficient of (dynamic) friction between the head slider and the magnetic layer tends to increase. When the amount of the fatty acid amide exceeds 3% by weight, the fatty acid amide bleeds out and causes some defects such as dropout. When the amount of the higher fatty acid ester is less than 0.2% by weight, the coefficient of dynamic friction is hardly decreased. When the amount of the higher fatty acid ester exceeds 3% by weight, the magnetic tape sticks to the guide of the feeding system.

The intermigration of the lubricants between the magnetic layer and the primer layer may be allowed.

When the MR head is used, the coefficient of dynamic friction ($\mu_{MsI}$) between the magnetic layer and the slider of the MR head is preferably 0.30 or less, more preferably 0.25 or less. When this coefficient of dynamic friction exceeds 0.30, the spacing loss tends to arise due to the contamination of the slider. The coefficient of dynamic friction of less than 0.10 is hardly realized.

The coefficient of dynamic friction ($\mu_{Msus}$) between the magnetic layer and SUS is preferably from 0.10 to 0.25, more preferably from 0.12 to 0.20. When this coefficient of dynamic friction is less than 0.10, the tape is so slidable on the guide portion that the tape cannot run stably. When this coefficient of dynamic friction exceeds 0.25, the guide rollers may easily be contaminated. The ratio of [($\mu_{MsI}$)/($\mu_{Msus}$)] is preferably from 0.7 to 1.3, more preferably from 0.8 to 1.2. In this preferred range, dislocation from a track (off-track) caused by the tape-meandering becomes smaller.

(f) Backcoat Layer

A backcoat layer is not an essential element but is preferably formed on the back face of the nonmagnetic support opposite to the surface carrying the magnetic layer thereon.

The thickness of a backcoat layer is preferably from 0.2 to 0.8 µm, more preferably from 0.3 to 0.8 µm, particularly from 0.3 to 0.6 µm. When the thickness of the backcoat layer is less than 0.2 µm, the effect to increase the running property is insufficient. When the thickness of the backcoat layer exceeds 0.8 µm, the total thickness of the magnetic tape increases, so that the recording capacity of the tape per one reel decreases.

The center line average surface roughness Ra of the backcoat layer is preferably from 3 to 15 nm, more preferably from 4 to 10 nm.

The coefficient of dynamic friction ($\mu_{Bsus}$) between the backcoat layer and SUS (stainless steel) is preferably from 0.10 to 0.30, more preferably from 0.10 to 0.25. When this coefficient of dynamic friction is less than 0.10, the magnetic tape becomes excessively slidable on the guide rollers, so that the running of the tape becomes unstable. When this coefficient of dynamic friction exceeds 0.30, the guide rollers tend to be contaminated. The ratio of [$(\mu_{Msl})/(\mu_{Bsus})$] is preferably from 0.8 to 1.5 more preferably from 0.9 to 1.4. Within this range, dislocation from a track (off-track) on the magnetic tape due to the tape-meandering becomes smaller.

The backcoat layer may contain carbon black such as acetylene black, furnace black, thermal black, etc. In general, carbon black with a small particle size and carbon black with a large particle size are used together. The total amount of carbon black with a small particle size and carbon black with a large particle size is preferably from 60 to 98% by weight, more preferably from 70 to 95% by weight.

The average particle size of small particle size carbon black is usually from 5 to 100 nm, preferably from 10 to 100 nm. When the average particle size of small particle size carbon black is too small, the dispersion thereof is difficult. When the average particle size of small particle size carbon black too large, a large amount of carbon black should be added. In either case, the surface of the backcoat layer is roughened so that the magnetic layer may be embossed with such a roughened surface of the backcoat layer.

When the large particle size carbon black having an average particle size of 300 to 400 nm is used in an amount of 5 to 15% by weight of the amount of carbon black of small particle size, the surface of the backcoat layer is not roughened and the effect to increase the tape-running performance is improved.

To enhance the strength of the backcoat layer, it is preferable to add additives which are usually added to the backcoat layer, for example, iron oxide or aluminum oxide each having an average particle size of 0.05 to 0.6 µm, more preferably 0.07 to 0.4 µm, most preferably 0.07 to 0.35 µm to the backcoat layer. When the average particle size of the additives is less than 0.05 µm, the effect to increase the strength is insufficient. When the average particle size of the additives exceeds 0.6 µm, the surface roughness of the backcoat layer increases so that the magnetic layer may be embossed with the roughened surface of the backcoat layer.

The additive such as the iron oxide above is preferably used in an amount of 2 to 40% by weight, more preferably 2 to 30% by weight, particularly preferably 2 to 20% by weight, most preferably 5 to 15% by weight. When the amount of the additive is less than 2% by weight, the effect to improve the strength is low. When the amount of the additive exceeds 40% by weight, the surface roughness of the backcoat layer increases.

Usually, the iron oxide or the aluminum oxide is added singly. When iron oxide and aluminum oxide are added together, the amount of aluminum oxide is preferably 20% by weight of less of the weight of the iron oxide.

A binder to be contained in the backcoat layer may comprise the same resin as used in the magnetic layer and the primer layer. Among these resins, the combination of a cellulose resin and a polyurethane resin is preferably used so as to decrease the coefficient of friction and to improve the tape-running performance.

The amount of the binder in the backcoat layer is usually from 40 to 150 parts by weight, preferably from 50 to 120 parts by weight, more preferably from 60 to 110 parts by weight, particularly from 70 to 110 parts by weight, based on the total 100 parts by weight of carbon black and the inorganic nonmagnetic powder in the backcoat layer. When the amount of the binder is too small, the strength of the backcoat layer is insufficient. When the amount of the binder too large, the coefficient of friction may increase. Preferably, 30 to 70 parts by weight of a cellulose resin and 20 to 50 parts by weight of a polyurethane resin are used.

To cure the binder, a crosslinking agent is preferably used. The crosslinking agent to be contained in the backcoat layer may be the same as those used in the magnetic layer and the primer layer, for example, a polyisocyanate compound. The amount of the crosslinking agent is usually from 10 to 50 parts by weight, preferably from 10 to 35 parts by weight, more preferably from 10 to 30 parts by weight, based on 100 parts by weight of the binder. When the amount of the crosslinking agent is too small, the film strength of the backcoat layer tends to decrease. When the amount of the crosslinking agent too large, the coefficient of dynamic friction of the backcoat layer against SUS increases.

(g) Solvents of Paints

To prepare the magnetic paint, primer paint and backcoat paint, any conventionally used organic solvent may be used as a solvent. Examples of the organic solvent include aromatic solvents (e.g. benzene, toluene, xylene, etc.), ketone solvents (e.g. acetone, cyclohexanone, methyl ethyl ketone, methyl isobutyl ketone, etc.), ester solvents (e.g. ethyl acetate, butyl acetate, etc.), carbonate solvents (e.g. dimethyl carbonate, diethyl carbonate, etc.), and alcohols (e.g. ethanol, isopropanol, etc.). In addition, other organic solvents such as hexane, tetrahydrofuran, dimethylformamide, etc. may be used.

(h) Dispersion and Coating of Paints

In the preparation of the magnetic paint, primer paint and backcoat paint, any known method for the preparation of paints can be used. In particular, a kneading process using a kneader or the like and a primary dispersion process are preferably used in combination. In the primary dispersion process, a sand mill is preferably used since the dispersibility of the magnetic powder is improved and also the surface properties of the layers can be controlled.

When the magnetic paint, primer paint or backcoat paint is applied on the nonmagnetic support, any conventional application methods such as gravure coating, roll coating, blade coating, extrusion coating, etc. may be used. The application method of the primer layer and the magnetic layer may be a sequential multiple layer coating method in which the magnetic paint of the magnetic layer is applied on the primer layer which has been applied on the nonmagnetic support and dried, or a simultaneous multiple layer coating method (wet-on-wet method) in which the primer layer and the magnetic layer are applied at the same time.

In view of the leveling of the thin magnetic layer in the course of the application, the simultaneous multiple layer coating method, which applies the paint for the magnetic layer while the primer layer is still wet, is preferably used.

(i) LRT (Lapping/Rotary/Tissue) Treatment

The magnetic layer is subjected to a LRT treatment so as to optimize the surface smoothness, the coefficient of friction against the slider of the MR head and the cylinder material, the surface roughness and the surface shape. Thus, the running performance of the magnetic tape and the reproducing output with the MR head are improved, and the spacing loss is reduced.

The LRT treatment includes (A) lapping, (B) rotary treatment and (C) Tissue treatment as explained below.

(A) Lapping:

An abrasive tape (lapping tape) is moved by a rotary roll at a constant rate (standard: 14.4 cm/min.) in a direction reverse to the tape-feeding direction (standard: 400 m/min.), and is allowed to contact with the surface of the magnetic layer of the magnetic tape while being pressed under the guide block. In this step, the magnetic layer is polished while the unwinding tension of the magnetic tape and the tension of the lapping tape being maintained constant (standard: 100 g and 250 g, respectively).

The abrasive tape used in this step may be an abrasive tape with fine abrasive particles such as M20000, WA10000 or K10000. It is possible to use an abrasive wheel (lapping wheel) in place of or in combination with the abrasive tape. In case where frequent replacement is needed, the abrasive tape alone is used.

(B) Rotary Treatment

A rotary wheel having air-bleeding grooves (standard: width of 1 inch (25.4 mm); diameter of 60 mmϕ; air-bleeding groove width of 2 mm; groove angle of 45 degrees, manufactured by KYOWA SEIKO Co., Ltd.) is rotated at a constant revolution rate (usually 200 to 3,000 rpm; standard: 1,100 rpm) in a direction reverse to the feeding direction of the magnetic layer, while being allowed to be in contact with the magnetic layer of the magnetic tape at a constant contact angle (standard: 90 degrees). Thus, the surface of the magnetic layer is treated.

(C) Tissue Treatment

Tissue (a woven fabric, for example, Toraysee manufactured by Toray) is fed at a constant rate (standard: 14.0 mm/min.) by rotary rods, in a direction reverse to the feeding direction of the magnetic tape, so as to clean the surfaces of the backcoat layer and the magnetic layer of the magnetic tape, respectively.

EXAMPLES

The present invention will be explained in detail by way of the following Examples. In Examples and Comparative Examples, "parts"[1] are "parts by weight".

Example 1

(A) Preparation of Iron Nitride Magnetic Powder

Magnetite particles having a substantially spherical shape and an average particle size of 25 nm (10 g) was dispersed in water (500 cc) with an ultrasonic disperser for 30 minutes. To this dispersion, yttrium nitrate (2.5 g) was added and dissolved followed by stirring for 30 minutes.

Separately, sodium hydroxide (0.8 g) was dissolved in water (100 cc). This aqueous solution of sodium hydroxide was dropwise added to the above dispersion over about 30 minutes. After the addition of the aqueous solution, the mixture was stirred for further 1 hour. Thereby, yttrium hydroxide was deposited on the surfaces of the magnetite particles. Then, the magnetite particles was washed with water and filtrated. The recovered particles were dried at 90° C. to obtain a powder comprising the magnetite particles the surfaces of which were covered with yttrium hydroxide.

The powder comprising the magnetite particles the surfaces of which were covered with yttrium hydroxide was heated and reduced in a hydrogen stream at 450° C. for 2 hours to obtain an yttrium-iron magnetic powder. This powder was cooled to 150° C. over about 1 hour while flowing hydrogen gas, and then the hydrogen gas was switched to an ammonia gas, and the particles were nitrided for 30 hours while maintaining the temperature at 150° C. Thereafter, the particles were cooled from 150° C. to 90° C. while flowing the ammonia gas, and then the ammonia gas was switched to a mixed gas of oxygen and nitrogen to stabilize the particles for 2 hours.

After that, the particles were further cooled from 90° C. to 40° C. and maintained at 40° C. for about 10 hours, while flowing the mixed gas of oxygen and nitrogen, and then they were recovered in an air.

The contents of yttrium and nitrogen of the resulting yttrium-iron nitride magnetic powder were analyzed with a fluorescent X-ray analysis and 5.3 atomic % and 10.8 atomic %, respectively, based on the amount of iron. The X-ray diffraction pattern showed the profile corresponding to the $Fe_{16}N_2$ phase. FIG. 1 is the X-ray diffraction pattern of the yttrium-iron nitride magnetic powder of this Example, which shows the diffraction peaks assigned to the $Fe_{16}N_2$ phase and the α-Fe phase. Thus, it was confirmed that the yttrium-iron nitride magnetic powder of this Example composed of the mixed phase of the $Fe_{16}N_2$ phase and the α-Fe phase.

Figure 2:
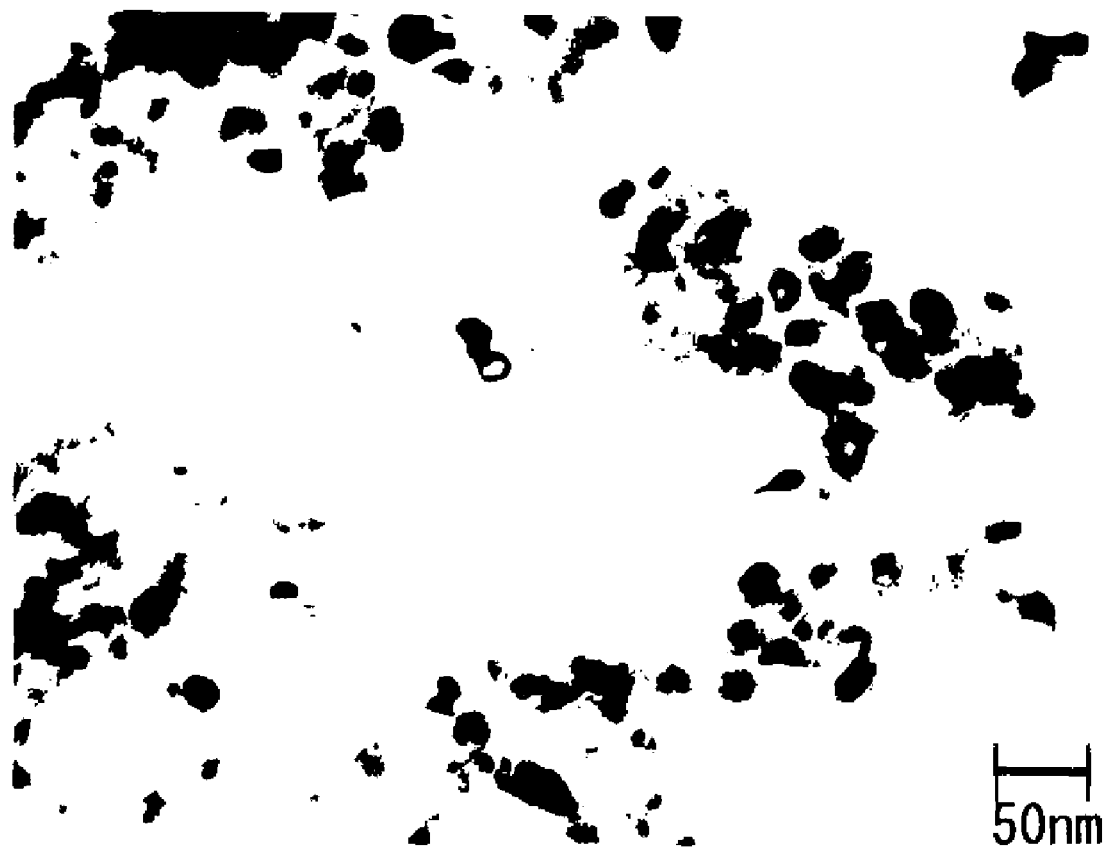
FIG. 2 is a transmission electron microscopic photograph (magnification: 200,000 times) of the yttrium-iron nitride magnetic powder used in Example 1.

Furthermore, the particles were observed with a high dissolution transmission electron microscope. The particle shape was substantially spherical, and the average particle size was 22 nm. FIG. 2 shows the photograph (magnification: 200,000 times) of the magnetic powder of this Example taken with the transmission electron microscope. The magnetic powder had a BET specific surface area of 53.2 $m^2/g$.

The saturation magnetization and coercive force of the magnetic powder of this Example, which were measured by applying a magnetic field of 1,270 kA/m (16 kOe), were 135.2 $Am^2/kg$ (135.2 emu/g) and 226.9 kA/m (2,850 Oe), respectively.

(B) Production of Magnetic Tape

The following components of a primer paint were kneaded with a kneader and then dispersed with a sand mill at a residence time of 60 minutes. To the dispersion, 6 parts of a polyisocyanate was added, and the mixture was stirred and filtrated to obtain a primer paint.

Separately, the following components (1) of a magnetic paint were kneaded with a kneader and dispersed with a sand mill at a residence time of 45 minutes. To the resulting mixture, the following components (2) of a magnetic paint were added and mixed. Thereafter, the mixture was stirred in a vessel in which a radially magnetized cylindrical permanent magnet was inserted to obtain a magnetic paint.

<Components of a Primer Paint>

| | |
|---|---|
| Iron oxide powder (av. particle size: 55 nm) | 70 parts |
| Aluminum oxide powder (av. particle size: 80 nm) | 10 parts |
| Carbon black (av. particle size: 25 nm) | 20 parts |
| Vinyl chloride-hydroxypropyl methacrylate copolymer ($-SO_3Na$ group content: $0.7 \times 10^{-4}$ eq./g) | 10 parts |

-continued

| Polyesterpolyurethane resin ($-SO_3Na$ group content: $1 \times 10^{-4}$ eq./g) | 5 parts |
|---|---|
| Methyl ethyl ketone | 130 parts |
| Toluene | 80 parts |
| Myristic acid | 1 part |
| Butyl stearate | 1.5 parts |
| Cyclohexanone | 65 parts |

<Components (1) of a Magnetic Paint>

| Yttrium-iron nitrogen magnetic iron metal powder (prepared in Step (A) above) | 100 parts |
|---|---|
| Vinyl chloride-hydroxypropyl acrylate copolymer ($-SO_3Na$ group content: $0.7 \times 10^{-4}$ eq./g) | 8 parts |
| Polyesterpolyurethane resin ($-SO_3Na$ group content: $1 \times 10^{-4}$ eq./g) | 4 parts |
| α-Alumina (av. particle size: 80 nm) | 10 parts |
| Carbon black (av. particle size: 25 nm) | 1.5 part |
| Myristic acid | 1.5 parts |
| Methyl ethyl ketone | 133 parts |
| Toluene | 100 parts |

<Components (2) of a Magnetic Paint>

| Stearic acid | 1.5 parts |
|---|---|
| Polyisocyanate (Colonate L manufactured by Nippon Polyurethane Kogyo K.K.) | 4 parts |
| Cyclohexanone | 133 parts |
| Toluene | 33 parts |

The primer paint was applied on a nonmagnetic support made of a polyethylene naphthalate film having a thickness of 6 μm (coefficients of thermal shrinkage in the machine and transverse directions: 0.8% and 0.6%, respectively when measured at 105° C. for 30 minutes) so that the primer layer could have a thickness of 2 μm after being dried and calendered, and then, the above magnetic paint was applied on the primer layer by a wet-on-wet method so that the magnetic layer could have a thickness of 120 nm after being oriented in a magnetic field, dried and calendered.

Then, a backcoat paint was applied on the back face of the nonmagnetic support opposite to the surface carrying the primer layer and the magnetic layer so that the backcoat layer could have a thickness of 700 nm after being dried and calendered, and then dried.

The backcoat paint was prepared by dispersing the following components of a backcoat paint with a sand mill at a residence time of 45 minutes, and then adding a polyisocyanate (8.5 parts), followed by stirring and filtrating.

<Components of a Backcoat Paint>

| Carbon black (av. particle size: 25 nm) | 40.5 parts |
|---|---|
| Carbon black (av. particle size: 350 nm) | 0.5 part |
| Barium sulfate | 4.05 parts |
| Nitrocellulose | 28 parts |
| Polyurethane resin (containing $-SO_3Na$ groups) | 20 parts |
| Cyclohexanone | 100 parts |
| Toluene | 100 parts |
| Methyl ethyl ketone | 100 parts |

The magnetic sheet obtained was planished by five-stage calendering at a temperature of 70° C. under a linear pressure of 150 kgf/cm, and wound onto a core and aged at 60° C. and 40% RH for 48 hours. The magnetic sheet was cut into a plurality of magnetic tapes each having a width of ½ inch. Then, the magnetic tape was abraded with a ceramic wheel (revolution: +150%, winding angle: 30 degrees) while running the tape at a rate of 100 m/min to obtain the magnetic tape having a length of 609 m. This magnetic tape was set in a cartridge to obtain a tape for a computer.

Example 2

A magnetic tape was produced in the same manner as in Example 1 except that the thickness of the magnetic layer after the orientation in a magnetic field, drying and calendering was changed to 50 nm in the production process of the magnetic tape, and then the tape was set in a cartridge to obtain a tape for a computer.

Example 3

In the production process of an iron nitride magnetic powder according to Example 1, the magnetic powder, which had been coated with yttrium hydroxide, was redispersed in a solution of 0.07 mole of boric acid dissolved in 30 cc of water, then the dispersion was filtrated and the powder was dried at 60° C. for 4 hours to remove water. Thereby, a magnetic powder, the particles of which were covered with yttrium containing boron, was obtained. This magnetic powder was reduced with hydrogen, nitrided with ammonia and stabilized in the same manner as in Example 1 to obtain a yttrium-iron nitride-boron magnetic powder.

The contents of yttrium and nitrogen of the resulting yttrium-iron nitride-boron magnetic powder were analyzed with a fluorescent X-ray analysis and 4.0 atomic % and 9.0 atomic %, respectively, based on the amount of iron. The content of boron was 3.0 atomic %. The X-ray diffraction pattern showed the profile corresponding to the $Fe_{16}N_2$ phase.

Furthermore, the particles were observed with a high dissolution transmission electron microscope. The particle shape was substantially spherical, and the average particle size was 20 nm. The magnetic powder had a BET specific surface area of 56.1 $m^2$/g.

The saturation magnetization and coercive force of the magnetic powder of this Example, which were measured by applying a magnetic field of 1,270 kA/m (16 kOe), were 105.7 $Am^2$/kg (105.7 emu/g) and 213.4 kA/m (2,680 Oe), respectively.

A magnetic tape was produced in the same manner as in the production process of a magnetic tape of Example 1 except that 100 parts of the yttrium-iron nitrogen-boron magnetic powder produced in the previous step was used in place of 100 parts of the yttrium-iron nitride magnetic powder in Components (1) of a magnetic paint, and then the magnetic tape was set in a cartridge to obtain a tape for a computer.

Example 4

A magnetic tape was produced in the same manner as in Example 3 except that the thickness of the magnetic layer after the drying and calendering was changed to 30 nm in the production process of the magnetic tape, and then the tape was set in a cartridge to obtain a tape for a computer.

Example 5

Preparation of Iron Nitride Magnetic Powder

Magnetite particles having a substantially spherical shape and an average particle size of 18 nm (10 g) was dispersed in water (500 cc) with an ultrasonic disperser for 30 minutes. To this dispersion, yttrium nitrate (0.5 g) was added and dissolved followed by stirring for 30 minutes.

Separately, sodium hydroxide (0.16 g) was dissolved in water (100 cc). This aqueous solution of sodium hydroxide was dropwise added to the above dispersion over about 30 minutes. After the addition of the aqueous solution, the mixture was stirred for further 1 hour.

To this dispersion, sodium silicate (1.13 g) was added and dissolved followed by stirring for 30 minutes. To the dispersion containing dissolved sodium silicate, nitric acid (0.6 g) diluted by 10 times was dropwise added over 30 minutes.

By the above treatments, yttrium hydroxide and silicon hydroxide were deposited on the surfaces of the magnetite particles. Then, the magnetite particles washed with water and filtrated. The recovered particles were dried at 90° C. to obtain a powder comprising the magnetite particles the surfaces of which were covered with yttrium hydroxide and silicon hydroxide.

The powder comprising the magnetite particles the surfaces of which were covered with yttrium hydroxide and silicon hydroxide was heated and reduced in a hydrogen stream at 430° C. for 2 hours to obtain an yttrium-silicon-iron magnetic powder. This powder was cooled to 150° C. over about 1 hour while flowing the hydrogen gas, and then the hydrogen gas was switched to an ammonia gas, and the particles were nitrided for 30 hours while maintaining the temperature at 150° C. Thereafter, the particles were cooled from 150° C. to 90° C. while flowing the ammonia gas, and then the ammonia gas was switched to a mixed gas of oxygen and nitrogen to stabilize the particles for 2 hours.

After that, the particles were further cooled from 90° C. to 40° C. and maintained at 40° C. for about 10 hours, while flowing the mixed gas of oxygen and nitrogen, and then they were recovered in an air.

The contents of yttrium, silicon and nitrogen of the resulting yttrium-silicon-iron nitride magnetic powder were analyzed with a fluorescent X-ray analysis and 1.1 atomic %, 2.8 atomic % and 10.3 atomic %, respectively, based on the amount of iron. The X-ray diffraction pattern showed the profile corresponding to the $Fe_{16}N_2$ phase.

Furthermore, the particles were observed with a high dissolution transmission electron microscope. The particle shape was substantially spherical, and the average particle size was 15 nm. The magnetic powder had a BET specific surface area of 90.1 $m^2$/g.

The saturation magnetization and coercive force of the magnetic powder of this Example, which were measured by applying a magnetic field of 1,270 kA/m (16 kOe), were 102.8 $Am^2$/kg (102.8 emu/g) and 215.8 kA/m (2,710 Oe), respectively.

<Production of Magnetic Tape>

A magnetic tape was produced in the same manner as in Example 2 except that the thickness of the magnetic layer after the orientation in a magnetic field, drying and calendering was changed to 50 nm in the production process of the magnetic tape, and then the tape was set in a cartridge to obtain a tape for a computer.

Example 6

Production of Iron Nitride Magnetic Powder

Silicon hydroxide was deposited on the surfaces of magnetite particles in the same manner as in Example 5 except that no yttrium nitrate was added and the amount of sodium silicate added was changed from 1.13 g to 2.03 g, and the amount of nitric acid was changed from 0.6 g to 1.08 g. Then, the magnetite particles were washed with water and filtrated, and the recovered particles were dried at 90° C. to obtain the magnetite powder the particle surfaces of which were covered with silicon hydroxide.

Thereafter, the powder comprising the magnetite particles the surfaces of which were covered with silicon hydroxide was heated and reduced in a hydrogen stream under the same conditions as those in Example 5 to obtain a silicon-iron magnetic powder. This powder was then nitrided and stabilized under the same conditions as those in Example 5 and recovered in the air.

The contents of silicon and nitrogen of the resulting silicon-iron nitride magnetic powder were analyzed with a fluorescent X-ray analysis and 4.7 atomic % and 11.2 atomic %, respectively, based on the amount of iron. The X-ray diffraction pattern showed the profile corresponding to the $Fe_{16}N_2$ phase.

Furthermore, the particles were observed with a high dissolution transmission electron microscope. The particle shape was substantially spherical, and the average particle size was 14 nm. The magnetic powder had a BET specific surface area of 92.3 $m^2$/g.

The saturation magnetization and coercive force of the magnetic powder of this Example, which were measured by applying a magnetic field of 1,270 kA/m (16 kOe), were 98.1 $Am^2$/kg (98.1 emu/g) and 214.1 kA/m (2,690 Oe), respectively.

<Production of Magnetic Tape>

A magnetic tape was produced in the same manner as in Example 2 except that the thickness of the magnetic layer after the orientation in a magnetic field, drying and calendering was changed to 50 nm in the production process of the magnetic tape, and then the tape was set in a cartridge to obtain a tape for a computer.

Example 7

Preparation of Iron Nitride Magnetic Powder

Magnetite particles having a substantially spherical shape and an average particle size of 18 nm (10 g) was dispersed in water (500 cc) with an ultrasonic disperser for 30 minutes. To this dispersion, yttrium nitrate (0.5 g) was added and dissolved followed by stirring for 30 minutes.

Separately, sodium hydroxide (0.16 g) was dissolved in water (100 cc). This aqueous solution of sodium hydroxide was dropwise added to the above dispersion over about 30 minutes. After the addition of the aqueous solution, the mixture was stirred for further 1 hour.

To this dispersion, sodium aluminate (0.68 g) was added and dissolved followed by stirring for 30 minutes. To the dispersion containing dissolved sodium aluminate, nitric acid (0.6 g) diluted by 10 times was dropwise added over 30 minutes.

By the above treatments, yttrium hydroxide and aluminum hydroxide were deposited on the surfaces of the magnetite particles. Then, the magnetite particles washed with water and filtrated. The recovered particles were dried at 90° C. to obtain a powder comprising the magnetite particles the surfaces of which were covered with yttrium hydroxide and aluminum hydroxide.

The powder comprising the magnetite particles the surfaces of which were covered with yttrium hydroxide and aluminum hydroxide was heated and reduced in a hydrogen stream at 430° C. for 2 hours to obtain an yttrium-aluminum-iron magnetic powder. This powder was cooled to 150° C. over about 1 hour while flowing the hydrogen gas, and then the hydrogen gas was switched to an ammonia gas, and the particles were nitrided for 30 hours while maintaining the temperature at 150° C. Thereafter, the particles were cooled from 150° C. to 90° C. while flowing the ammonia gas, and then the ammonia gas was switched to a mixed gas of oxygen and nitrogen to stabilize the particles for 2 hours.

After that, the particles were further cooled from 90° C. to 40° C. and maintained at 40° C. for about 10 hours, while flowing the mixed gas of oxygen and nitrogen, and then they were recovered in an air.

The contents of yttrium, aluminum and nitrogen of the resulting yttrium-aluminum-iron nitride magnetic powder were analyzed with a fluorescent X-ray analysis and 1.1 atomic %, 3.1 atomic % and 9.8 atomic %, respectively, based on the amount of iron. The X-ray diffraction pattern showed the profile corresponding to the $Fe_{16}N_2$ phase.

Furthermore, the particles were observed with a high dissolution transmission electron microscope. The particle shape was substantially spherical, and the average particle size was 15 nm. The magnetic powder had a BET specific surface area of 93.3 m$^2$/g.

The saturation magnetization and coercive force of the magnetic powder of this Example, which were measured by applying a magnetic field of 1,270 kA/m (16 kOe), were 103.1 Am$^2$/kg (103.1 emu/g) and 211.7 kA/m (2,660 Oe), respectively.

<Production of Magnetic Tape>

A magnetic tape was produced in the same manner as in Example 2 except that the thickness of the magnetic layer after the orientation in a magnetic field, drying and calendering was changed to 50 nm in the production process of the magnetic tape, and then the tape was set in a cartridge to obtain a tape for a computer.

Example 8

Production of Iron Nitride Magnetic Powder

Aluminum hydroxide was deposited on the surfaces of magnetite particles in the same manner as in Example 7 except that no yttrium nitrate was added, the amount of sodium aluminate added was changed from 0.68 g to 1.0 g, and the amount of nitric acid was changed from 0.6 g to 0.9 g. Then, the magnetite particles were washed with water and filtrated, and the recovered particles were dried at 90° C. to obtain the magnetite powder the particle surfaces of which were covered with aluminum hydroxide.

Thereafter, the powder comprising the magnetite particles the surfaces of which were covered with aluminum hydroxide was heated and reduced in a hydrogen stream under the same conditions as those in Example 5 to obtain an aluminum-iron magnetic powder. This powder was then nitrided and stabilized under the same conditions as those in Example 5 and recovered in the air.

The contents of aluminum and nitrogen of the resulting aluminum-iron nitride magnetic powder were analyzed with a fluorescent X-ray analysis and 4.6 atomic % and 10.0 atomic %, respectively, based on the amount of iron. The X-ray diffraction pattern showed the profile corresponding to the $Fe_{16}N_2$ phase.

Furthermore, the particles were observed with a high dissolution transmission electron microscope. The particle shape was substantially spherical, and the average particle size was 15 nm. The magnetic powder had a BET specific surface area of 90.5 m$^2$/g.

The saturation magnetization and coercive force of the magnetic powder of this Example, which were measured by applying a magnetic field of 1,270 kA/m (16 kOe), were 95.6 A/m$^2$/kg (95.6 emu/g) and 214.1 kA/m (2,690 Oe), respectively.

<Production of Magnetic Tape>

A magnetic tape was produced in the same manner as in Example 2 except that the thickness of the magnetic layer after the orientation in a magnetic field, drying and calendering was changed to 50 nm in the production process of the magnetic tape, and then the tape was set in a cartridge to obtain a tape for a computer.

Example 9

Preparation of Iron Nitride Magnetic Powder

Magnetic powder comprising magnetite particles the surfaces of which were covered with yttrium hydroxide and silicon hydroxide was prepared in the same manner as in Example 5 except that magnetite particles having a substantially spherical shape and an average particle size of 11 nm was used.

The powder comprising the magnetite particles the surfaces of which were covered with yttrium hydroxide and silicon hydroxide was heated and reduced in a hydrogen stream at 400° C. for 2 hours to obtain an yttrium-silicon-iron magnetic powder. This powder was cooled to 150° C. over about 1 hour while flowing the hydrogen gas, and then the hydrogen gas was switched to an ammonia gas, and the particles were nitrided for 30 hours while maintaining the temperature at 150° C. Thereafter, the particles were cooled from 150° C. to 90° C. while flowing the ammonia gas, and then the ammonia gas was switched to a mixed gas of oxygen and nitrogen to stabilize the particles for 2 hours.

After that, the particles were further cooled from 90° C. to 40° C. and maintained at 40° C. for about 10 hours, while flowing the mixed gas of oxygen and nitrogen, and then they were recovered in an air.

The contents of yttrium, silicon and nitrogen of the resulting yttrium-silicon-iron nitride magnetic powder were analyzed with a fluorescent X-ray analysis and 1.1 atomic %, 2.9 atomic % and 9.3 atomic %, respectively, based on the amount of iron. The X-ray diffraction pattern showed the profile corresponding to the $Fe_{16}N_2$ phase.

Furthermore, the particles were observed with a high dissolution transmission electron microscope. The particle shape was substantially spherical, and the average particle size was 9 nm. The magnetic powder had a BET specific surface area of 153.3 m$^2$/g.

The saturation magnetization and coercive force of the magnetic powder of this Example, which were measured by applying a magnetic field of 1,270 kA/m (16 kOe), were 81.1 Am$^2$/kg (81.1 emu/g) and 200.6 kA/m (2,520 Oe), respectively.

<Production of Magnetic Tape>

A magnetic tape was produced in the same manner as in Example 2 except that the thickness of the magnetic layer after the orientation in a magnetic field, drying and calendering was changed to 50 nm in the production process of the magnetic tape, and then the tape was set in a cartridge to obtain a tape for a computer.

Comparative Example 1

Yttrium-iron nitride magnetic powder was prepared in the same manner as in Example 1 except that magnetite powder having an average particle size of 85 nm was used as a raw material in place of magnetite powder having an average particle size of 25 nm.

The contents of yttrium and nitrogen of the resulting yttrium-iron nitride magnetic powder were analyzed with a fluorescent X-ray analysis and 5.0 atomic % and 12.5 atomic %, respectively, based on the amount of iron. The X-ray diffraction pattern showed the profile corresponding to the $Fe_{16}N_2$ phase. Furthermore, the particles were observed with a high dissolution transmission electron microscope. The particle shape was substantially spherical, and the average particle size was 60 nm. The magnetic powder had a BET specific surface area of 8.3 $m^2/g$. The saturation magnetization and coercive force of the magnetic powder of this Example, which were measured by applying a magnetic field of 1,270 kA/m (16 kOe), were 194.2 $Am^2/kg$ (194.2 emu/g) and 183.9 kA/m (2,310 Oe), respectively.

Then, a magnetic tape was produced in the same manner as in the production process of a magnetic tape of Example 1 except that 100 parts of the yttrium-iron nitrogen-boron magnetic powder produced in the previous step was used in place of 100 parts of the yttrium-iron nitride magnetic powder in Components (1) of a magnetic paint, and then the magnetic tape was set in a cartridge to obtain a tape for a computer.

Comparative Example 2

A magnetic tape was produced in the same manner as in Comparative Example 1 except that the thickness of the magnetic layer after drying and calendering was changed to 90 nm, and then the magnetic tape was set in a cartridge to obtain a tape for a computer.

Comparative Example 3

A magnetic tape was produced in the same manner as in Example 1 except that 100 parts of acicular iron-cobalt alloy magnetic powder [Co/Fe: 24.6% by weight; specific surface area: 55.3 $m^2/g$; coercive force: 183.1 kA/m (2,300 Oe); saturation magnetization: 135.0 $Am^2/kg$ (135.0 emu/g); average major axis length: 80 nm; acicular ratio: 3] was used in place of 100 parts of the yttrium-iron nitride magnetic powder in Components (1) of a magnetic paint, and then the magnetic tape was set in a cartridge to obtain a tape for a computer.

Comparative Example 4

Preparation of Magnetic Powder

Magnetite particles having a substantially spherical shape and an average particle size of 25 nm (10 g) was dispersed in water (500 cc) with an ultrasonic disperser for 30 minutes. To this dispersion, yttrium nitrate (2.5 g) was added and dissolved followed by stirring for 30 minutes. Separately, sodium hydroxide (0.8 g) was dissolved in water (100 cc). This aqueous solution of sodium hydroxide was dropwise added to the above dispersion over about 30 minutes. After the addition of the aqueous solution, the mixture was stirred for further 1 hour. Thereby, yttrium hydroxide was deposited on the surfaces of the magnetite particles. Then, the magnetite particles washed with water and filtrated. The recovered particles were dried at 90° C. to obtain a powder comprising the magnetite particles the surfaces of which were covered with yttrium hydroxide.

The powder comprising the magnetite particles the surfaces of which were covered with yttrium hydroxide was heated and reduced in a hydrogen stream at 450° C. for 2 hours to obtain an yttrium-iron magnetic powder. This powder was cooled to 90° C., and then the hydrogen gas was switched to a mixed gas of oxygen and nitrogen to stabilize the particles for 2 hours. After that, the particles were further cooled from 90° C. to 40° C. and maintained at 40° C. for about 10 hours, while flowing the mixed gas of oxygen and nitrogen, and then they were recovered in an air.

Thus, the yttrium-iron magnetic powder was produced without nitriding. The content of yttrium in this magnetic powder was 5.4 atomic %. The X-ray diffraction pattern had a diffraction peak assigned to the α-Fe phase.

Furthermore, the particles were observed with a high dissolution transmission electron microscope. The particle shape was substantially spherical, and the average particle size was 22 nm. The magnetic powder had a BET specific surface area of 55.1 $m^2/g$.

The saturation magnetization and coercive force of the magnetic powder of this Example, which were measured by applying a magnetic field of 1,270 kA/m (16 kOe), were 137.7 $Am^2/kg$ (137.7 emu/g) and 156.0 kA/m (1,960 Oe), respectively.

Thereafter, a magnetic tape was produced in the same manner as in Example 1 except that the thickness of the magnetic layer after the orientation in the magnetic field, drying and calendering was changed to 120 nm, and then the magnetic tape was set in a cartridge to obtain a tape for a computer.

Comparative Example 5

Preparation of Magnetic Powder

Magnetite particles having a substantially spherical shape and an average particle size of 25 nm (10 g) was dispersed in water (500 cc) with an ultrasonic disperser for 30 minutes. To this dispersion, yttrium nitrate (2.5 g) was added and dissolved followed by stirring for 30 minutes. Separately, sodium hydroxide (0.8 g) was dissolved in water (100 cc). This aqueous solution of sodium hydroxide was dropwise added to the above dispersion over about 30 minutes. After the addition of the aqueous solution, the mixture was stirred for further 1 hour. Thereby, yttrium hydroxide was deposited on the surfaces of the magnetite particles. The magnetic powder obtained was redispersed in a solution of 0.007 mole of boric acid dissolved in 30 cc of water, then the dispersion was filtrated and the powder was dried at 60° C. for 4 hours to remove water. Thereby, a magnetic powder, the particles of which were covered with yttrium containing boron, was obtained. This magnetic powder washed with water and filtrated, followed by drying at 90° C. to obtain a magnetic powder comprising the magnetite particles the surfaces of which were covered with yttrium hydroxide and boron.

The powder comprising the magnetite particles the surfaces of which were covered with yttrium hydroxide was heated and reduced in a hydrogen stream at 450° C. for 2 hours to obtain an yttrium-boron-iron magnetic powder. This powder was cooled to 90° C., and then the hydrogen gas was switched to a mixed gas of oxygen and nitrogen to stabilize the particles for 2 hours. After that, the particles were further cooled from 90° C. to 40° C. and maintained at 40° C. for about 10 hours, while flowing the mixed gas of oxygen and nitrogen, and then they were recovered in an air.

Thus, the yttrium-boron-iron magnetic powder was obtained without nitriding.

The contents of yttrium and boron of the resulting yttrium-boron-iron magnetic powder were analyzed with a fluorescent X-ray analysis and 4.0 atomic % and 3.1 atomic %, respectively, based on the amount of iron. The X-ray diffraction pattern showed the diffraction peak assigned to the α-Fe phase. Thus, it was confirmed that the yttrium-iron nitride magnetic powder of this Example composed of the mixed phase of the $Fe_{16}N_2$ phase and the α-Fe phase.

Furthermore, the particles were observed with a high dissolution transmission electron microscope. The particle shape was substantially spherical, and the average particle size was 22 nm. The magnetic powder had a BET specific surface area of 54.3 m²/g.

The saturation magnetization and coercive force of the magnetic powder of this Example, which were measured by applying a magnetic field of 1,270 kA/m (16 kOe), were 133.9 Am²/kg (133.9 emu/g) and 172.7 kA/m (2,170 Oe), respectively.

Thereafter, a magnetic tape was produced in the same manner as in Example 1 except that the thickness of the magnetic layer after the orientation in the magnetic field, drying and calendering was changed to 120 nm, and then the magnetic tape was set in a cartridge to obtain a tape for a computer.

With the magnetic tapes of Examples 1-9 and Comparative Examples 1-5, a coercive force in the longitudinal direction, a squareness ratio and the product of a saturated magnetic flux density and a thickness of a magnetic layer were measured and calculated as magnetic properties of the magnetic tapes, and the electromagnetic conversion characteristic was measured by the method described below. The results are shown in Table 1. This Table also includes the average particle sizes of the magnetic powders used in the production of the magnetic tapes, and the thickness of the magnetic layer.

<Measurement of Electromagnetic Conversion Characteristic>

After running a magnetic tape five times using a LTO drive (manufactured by Hewlett-Packard) at 40° C. and 5% RH, random data signals having the shortest recording wavelength of 0.33 μm are recorded in the magnetic tape and an output was read with a reproduction head, and the output (dB) is reported as a relative value (dB) to that of Comparative Example 3 (0 dB as the standard).

TABLE 1

|  | Example No. | | | | Comp. Example No. | | |
| --- | --- | --- | --- | --- | --- | --- | --- |
|  | 1 | 2 | 3 | 4 | 1 | 2 | 3 |
| Av. particle size of magnetic powder (nm) | 22 | 22 | 20 | 20 | 60 | 60 | 60 (major axis length) |
| Thickness of magnetic layer (nm) | 120 | 50 | 120 | 30 | 120 | 90 | 120 |
| Coercive force [Hc] (kAa/m) | 262.7 | 256.4 | 274.7 | 267.5 | 207.0 | 189.5 | 195.1 |
| Squareness ratio [Br/Bm] | 0.89 | 0.85 | 0.91 | 0.86 | 0.79 | 0.72 | 0.82 |
| (Saturated magnetic flux density) × (thickness of magnetic layer) [Bm·t] (μTm) | 0.036 | 0.014 | 0.032 | 0.008 | 0.042 | 0.032 | 0.043 |
| Output [C] (dB) | 1.8 | 2.5 | 1.9 | 2.3 | 0.2 | 0 | 0 |
| C/N (dB) | 12.5 | 14.2 | 8.1 | 7.9 | 0.5 | 0.0 | 0.8 |

|  | Example No. | | | | | Comp. Ex. No. | |
| --- | --- | --- | --- | --- | --- | --- | --- |
|  | 5 | 6 | 7 | 8 | 9 | 4 | 5 |
| Av. particle size of magnetic powder (nm) | 15 | 14 | 15 | 15 | 9 | 22 | 22 |
| Thickness of magnetic layer (nm) | 50 | 50 | 50 | 50 | 50 | 120 | 120 |
| Coercive force [Hc] (kAa/m) | 261.1 | 248.4 | 254.0 | 239.6 | 234.7 | 178.1 | 198.5 |
| Squareness ratio [Br/Bm] | 0.86 | 0.85 | 0.84 | 0.83 | 0.80 | 0.86 | 0.89 |

TABLE 1-continued

| | | | | | | | |
|---|---|---|---|---|---|---|---|
| (Saturated magnetic flux density) × (thickness of magnetic layer) [Bm · t] (µTm) | 0.012 | 0.011 | 0.012 | 0.010 | 0.009 | 0.035 | 0.031 |
| Output [C] (dB) | 1.9 | 1.8 | 1.9 | 1.7 | 1.6 | 0.9 | 1.1 |
| C/N (dB) | 15.7 | 13.1 | 14.5 | 12.2 | 15.0 | 6.9 | 6.5 |

From the results in Table 1, it is understood that the magnetic tapes of Examples 1-9 had a high output. In particular, when the magnetic layer was made very thin, for example, 50 nm (Example 2 and 5-9) or 30 nm (Example 4), the properties did no decrease materially, the high output was achieved, and the effect to decrease the noise was remarkable. As a result, the C/N ratio increased, and thus the magnetic tapes had the excellent high density recording characteristics.

On the contrary, when the substantially spherical magnetic particles having a large particle size was used as in the magnetic tapes of Comparative Examples 1 and 2, the surface smoothness of the tapes deteriorated, and the output greatly decreased when the magnetic layer was made thin. When the acicular magnetic powder was used as in the magnetic tape of Comparative Example 3, the high output was not obtained, and furthermore the noise level greatly increased in comparison with the magnetic tapes according to the present invention. As a result, the C/N ratio was much smaller than that of the magnetic tapes according to the present invention. In addition, with the magnetic powder which had the small particle size but were not nitrided as in the case of the magnetic tapes of Comparative Examples 4 and 5, the coercive force was not so large as that of the magnetic tapes according to the present invention. Thus, the output of the magnetic tapes of Comparative Examples 4 and 5 was lower than the magnetic tapes according to the present invention. The noise characteristics were influenced by such a small coercive force, and the C/N ratio was inferior to that of the magnetic tapes according to the present invention.

EFFECTS OF THE INVENTION

As described above, the present invention uses a magnetic powder, which comprises substantially spherical or ellipsoidal particles and at least iron and nitrogen as constituent elements, and has a $Fe_{16}N_2$ phase and an average particle size of 5 to 30 nm, to form a very thin magnetic layer having a thickness of 300 nm or less which does not decrease an output. Therefore, the magnetic recording medium of the present invention has a higher coercive force and a better surface smoothness than the conventional magnetic recording media. Thereby, the output is further increased, and the magnetic recording medium having excellent short wavelength recording characteristics can be provided.

The invention claimed is:

1. A magnetic recording medium comprising a nonmagnetic support and a magnetic layer formed on the support and containing a magnetic powder and a binder,
    wherein said magnetic powder comprises substantially spherical or ellipsoidal particles
    and said particles have an outer layer containing at least one element selected from the group consisting of rare earth elements, silicon and aluminum,
    and a core containing a $Fe_{16}N_2$ phase and
    wherein said particles have an average particle size of 5 to 50 nm,
    wherein said particles have an axis ratio (a ratio of a major axis to a minor axis) of 1 to 2, and
    wherein said magnetic layer has a coercive force of 234.7 to 318.4 kA/m (2,949 to 4,000 Oe).

2. The magnetic recording medium according to claim 1, wherein said particles have an average particle size of 5 to 30 nm.

3. The magnetic recording medium according to claim 1, wherein a content of nitrogen is from 1.0 to 20.0 atomic % based on the amount of iron in the magnetic powder.

4. The magnetic recording medium according to claim 1, wherein the rare earth element is at least one element selected from the group consisting of yttrium, samarium and neodymium.

5. The magnetic recording medium according to claim 1, wherein a content of the rare earth element is from 0.05 to 20.0 atomic % based on the amount of iron in the magnetic powder.

6. The magnetic recording medium according to claim 1, wherein a total content of silicon and aluminum is from 0.1 to 20.0 atomic % based on the amount of iron in the magnetic powder.

7. The magnetic recording medium according to claim 1, which has a squareness ratio (Br/Bm) of 0.6 to 0.9 both in the longitudinal direction, and a product (Bm·t) of a saturated magnetic flux density (Bm) and a thickness (t) of a magnetic layer of 0.001 to 0.1 µTm.

8. The magnetic recording medium according to claim 1, which further comprises a primer layer comprising at least one nonmagnetic powder and a binder, wherein said magnetic layer has a thickness of 10 to 300 nm.

* * * * *